(12) United States Patent
Dorval et al.

(10) Patent No.: US 9,469,208 B2
(45) Date of Patent: Oct. 18, 2016

(54) ROVER CHARGING SYSTEM

(71) Applicant: Symbotic, LLC, Wilmington, MA (US)

(72) Inventors: Rick K. Dorval, Dunbarton, NH (US); Predrag Puskarevic, Lexington, MA (US); John Matthews, Acton, MA (US)

(73) Assignee: Symbotic, LLC, Wilmington, MA (US)

( * ) Notice: Subject to any disclaimer, the term of this patent is extended or adjusted under 35 U.S.C. 154(b) by 157 days.

(21) Appl. No.: 14/209,261

(22) Filed: Mar. 13, 2014

(65) Prior Publication Data

US 2014/0312838 A1 Oct. 23, 2014

Related U.S. Application Data

(60) Provisional application No. 61/798,282, filed on Mar. 15, 2013.

(51) Int. Cl.
| | |
|---|---|
| *H01M 10/46* | (2006.01) |
| *B60L 11/18* | (2006.01) |
| *B60L 3/00* | (2006.01) |
| *B60L 3/04* | (2006.01) |
| *B60L 3/12* | (2006.01) |
| *B60L 11/00* | (2006.01) |

(52) U.S. Cl.
CPC .......... *B60L 11/1824* (2013.01); *B60L 3/0069* (2013.01); *B60L 3/04* (2013.01); *B60L 3/12* (2013.01); *B60L 11/005* (2013.01); *B60L 11/1809* (2013.01); *B60L 11/1816* (2013.01); *B60L 2240/36* (2013.01); *B60L 2240/545* (2013.01); *B60L 2240/547* (2013.01); *B60L 2240/549* (2013.01); *B60L 2250/10* (2013.01); *B60L 2260/32* (2013.01); *Y02T 10/7005* (2013.01); *Y02T 10/7022* (2013.01); *Y02T 10/7072* (2013.01); *Y02T 90/121* (2013.01); *Y02T 90/14* (2013.01)

(58) Field of Classification Search
CPC .............................. H02J 7/355; H02J 7/0042
USPC .......................... 320/107, 114, 115, 104, 109
See application file for complete search history.

(56) References Cited

U.S. PATENT DOCUMENTS

| | | | |
|---|---|---|---|
| 2,945,604 | A | 7/1960 | Kroll et al. |
| 3,016,154 | A | 1/1962 | Ugolini et al. |
| 3,161,303 | A | 12/1964 | Burrows |
| 3,554,390 | A | 1/1971 | Saul |
| 3,581,915 | A | 6/1971 | Saul |
| 4,777,416 | A | 10/1988 | George, II et al. |
| 4,856,263 | A | 8/1989 | Schneider et al. |
| 4,909,697 | A | 3/1990 | Bernard, II et al. |

(Continued)

FOREIGN PATENT DOCUMENTS

| | | |
|---|---|---|
| DE | 2150500 | 4/1973 |
| EP | 2073088 | 6/2009 |

(Continued)

OTHER PUBLICATIONS

US 8,290,622, 10/2012, Dooley et al. (withdrawn)

*Primary Examiner* — Edward Tso
(74) *Attorney, Agent, or Firm* — Perman & Green, LLP

(57) ABSTRACT

A charging system for an autonomous rover includes a charging interface with contacts that interface with the autonomous rover, a rover power source for the autonomous rover, and circuitry operated by the autonomous rover for controlling charging of the rover power source.

14 Claims, 14 Drawing Sheets

(56) References Cited

U.S. PATENT DOCUMENTS

| | | |
|---|---|---|
| 4,987,992 A | 1/1991 | Pfleger |
| 5,045,769 A | 9/1991 | Everett, Jr. |
| 5,220,263 A | 6/1993 | Onishi et al. |
| 5,273,392 A | 12/1993 | Bernard, II et al. |
| 5,323,098 A | 6/1994 | Hamaguchi et al. |
| 5,350,270 A | 9/1994 | Stallard et al. |
| 5,395,206 A | 3/1995 | Cerny, Jr. |
| 5,462,439 A | 10/1995 | Keith |
| 5,509,538 A | 4/1996 | Spindler et al. |
| 5,565,755 A | 10/1996 | Keith |
| 5,569,993 A | 10/1996 | Keith |
| 5,664,929 A | 9/1997 | Esaki et al. |
| 5,709,291 A | 1/1998 | Nishino et al. |
| 5,718,322 A | 2/1998 | Mulhern |
| 5,847,537 A | 12/1998 | Parmley, Sr. |
| 6,061,607 A | 5/2000 | Bradley et al. |
| 6,222,342 B1 | 4/2001 | Eggert et al. |
| 6,259,228 B1 | 7/2001 | Becker et al. |
| 6,262,559 B1 | 7/2001 | Eggert et al. |
| 6,289,260 B1 | 9/2001 | Bradley et al. |
| 6,325,586 B1 | 12/2001 | Loy |
| 6,377,867 B1 | 4/2002 | Bradley et al. |
| 6,394,260 B1 | 5/2002 | Barth et al. |
| 6,397,990 B1 | 6/2002 | Brien et al. |
| 6,404,168 B1 | 6/2002 | Shoji |
| 6,496,755 B2 | 12/2002 | Wallach et al. |
| 6,597,150 B1 | 7/2003 | Bertness et al. |
| 6,597,151 B1 | 7/2003 | Price et al. |
| 6,652,213 B1 | 11/2003 | Mitchel et al. |
| 6,764,373 B1 | 7/2004 | Osawa et al. |
| 6,836,701 B2 | 12/2004 | McKee |
| 6,859,682 B2 | 2/2005 | Naka et al. |
| 6,894,457 B2 | 5/2005 | Germagian et al. |
| 7,015,674 B2 | 3/2006 | VonderHaar |
| 7,054,716 B2 | 5/2006 | McKee et al. |
| 7,066,291 B2 | 6/2006 | Martins et al. |
| 7,133,746 B2 | 11/2006 | Abramson et al. |
| 7,137,593 B2 | 11/2006 | Baatz |
| 7,224,086 B2 | 5/2007 | Germagian et al. |
| D557,206 S | 12/2007 | Hussaini et al. |
| 7,329,081 B2 | 2/2008 | Baker et al. |
| 7,332,890 B2 | 2/2008 | Cohen et al. |
| 7,352,153 B2 | 4/2008 | Yan |
| 7,376,487 B2 | 5/2008 | Kumhyr |
| 7,397,213 B2 | 7/2008 | Im et al. |
| 7,460,462 B2 | 12/2008 | Mejia et al. |
| 7,520,376 B2 | 4/2009 | Bar |
| 7,532,947 B2 | 5/2009 | Waddington et al. |
| 7,591,630 B2 | 9/2009 | Lert, Jr. |
| 7,615,957 B2 | 11/2009 | Kim et al. |
| 7,653,457 B2 | 1/2010 | Bloom |
| 7,686,560 B2 | 3/2010 | Laurin et al. |
| 7,728,549 B2 | 6/2010 | Bartlett et al. |
| 7,826,920 B2 | 11/2010 | Stevens et al. |
| 7,856,290 B2 | 12/2010 | Kumhyr |
| 7,858,227 B2 | 12/2010 | Song et al. |
| 7,861,844 B2 | 1/2011 | Hayduchok et al. |
| 7,880,431 B2 | 2/2011 | Rayl et al. |
| 7,890,228 B2 | 2/2011 | Redmann, Jr. et al. |
| 7,894,940 B2 | 2/2011 | Kumhyr |
| 7,906,937 B2 | 3/2011 | Bhade et al. |
| 7,941,244 B2 | 5/2011 | Somin et al. |
| 7,945,798 B2 | 5/2011 | Carlson et al. |
| 7,991,505 B2 | 8/2011 | Lert, Jr. et al. |
| 8,004,237 B2 | 8/2011 | Manor et al. |
| 8,013,570 B2 | 9/2011 | Baxter et al. |
| 8,024,064 B1 | 9/2011 | Sanghavi et al. |
| 8,028,822 B2 | 10/2011 | Braunstein |
| 8,047,756 B2 | 11/2011 | Tuffs et al. |
| 8,072,184 B2 | 12/2011 | Bhade et al. |
| 8,076,900 B1 | 12/2011 | Brown |
| 8,080,975 B2 | 12/2011 | Bessa et al. |
| 8,097,356 B2 | 1/2012 | Horikoshi et al. |
| 8,253,373 B2 | 8/2012 | Manor et al. |
| 8,288,989 B2 | 10/2012 | Baba |
| 8,299,750 B2 | 10/2012 | Pai |
| 8,344,686 B2 | 1/2013 | Gaul et al. |
| 8,350,526 B2 | 1/2013 | Dyer et al. |
| 8,354,913 B2 | 1/2013 | Solomon et al. |
| 2002/0124389 A1 | 9/2002 | Matson |
| 2004/0088081 A1 | 5/2004 | Song et al. |
| 2004/0238326 A1 | 12/2004 | Lichti |
| 2005/0212478 A1 | 9/2005 | Takenaka |
| 2007/0114970 A1* | 5/2007 | Johnson ............... H02J 7/0093 320/128 |
| 2007/0114975 A1 | 5/2007 | Cohen et al. |
| 2007/0267998 A1 | 11/2007 | Cohen et al. |
| 2008/0007203 A1 | 1/2008 | Cohen et al. |
| 2008/0025833 A1 | 1/2008 | Baker et al. |
| 2008/0129445 A1 | 6/2008 | Kraimer et al. |
| 2008/0174268 A1 | 7/2008 | Koo et al. |
| 2009/0074545 A1 | 3/2009 | Lert et al. |
| 2009/0133733 A1* | 5/2009 | Retti ................... H01M 10/465 320/109 |
| 2009/0284245 A1 | 11/2009 | Kirby et al. |
| 2009/0315501 A1 | 12/2009 | Li et al. |
| 2010/0277005 A1 | 11/2010 | Karalis et al. |
| 2010/0277121 A1 | 11/2010 | Hall et al. |
| 2010/0308939 A1 | 12/2010 | Kurs |
| 2011/0058926 A1 | 3/2011 | Winkler |
| 2011/0082583 A1 | 4/2011 | Kumhyr |
| 2011/0106295 A1 | 5/2011 | Miranda et al. |
| 2011/0118903 A1 | 5/2011 | Kraimer et al. |
| 2011/0148364 A1 | 6/2011 | Ota |
| 2011/0216185 A1 | 9/2011 | Laws et al. |
| 2011/0234153 A1 | 9/2011 | Abramson |
| 2011/0238206 A1 | 9/2011 | Somin et al. |
| 2011/0246252 A1 | 10/2011 | Uesugi |
| 2011/0254503 A1 | 10/2011 | Widmer et al. |
| 2011/0285349 A1 | 11/2011 | Widmer et al. |
| 2012/0045303 A1 | 2/2012 | Macdonald |
| 2012/0200256 A1 | 8/2012 | Tse |
| 2012/0235477 A1 | 9/2012 | Korman |
| 2013/0043826 A1 | 2/2013 | Workman et al. |
| 2013/0127415 A1* | 5/2013 | Ohtomo ................ B60L 3/003 320/109 |

FOREIGN PATENT DOCUMENTS

| | | |
|---|---|---|
| WO | 2012119853 | 9/2012 |
| WO | 2012177193 | 12/2012 |

* cited by examiner

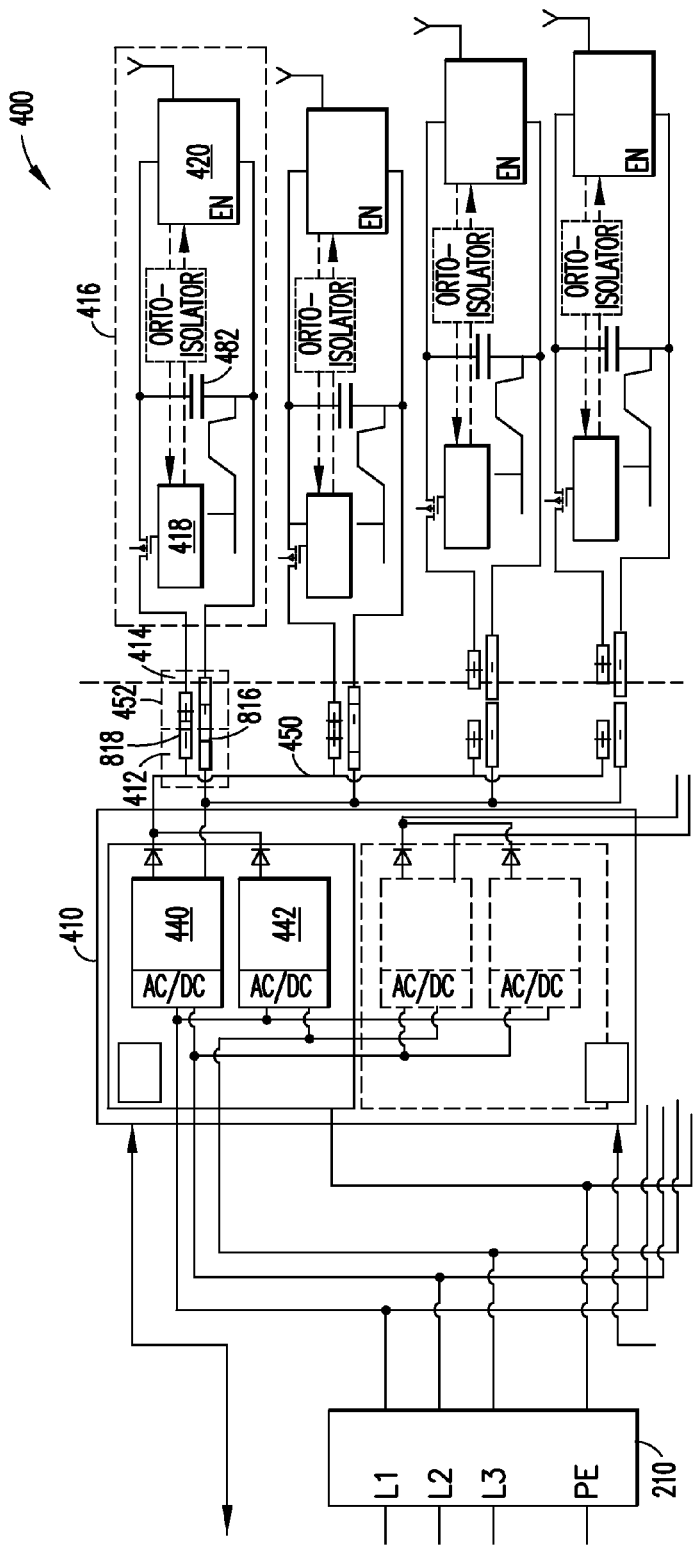
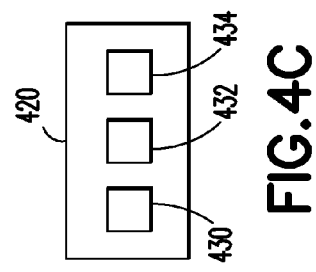
FIG. 4A
FIG. 4B
FIG. 4C

ROVER CHARGING SYSTEM

CROSS-REFERENCE TO RELATED APPLICATIONS

This application is a non-provisional of and claims the benefit of U.S. provisional patent application 61/798,282 filed on Mar. 15, 2013, the disclosure of which is incorporated herein by reference in its entirety.

BACKGROUND

1. Field

The exemplary embodiments generally relate to material handling systems and, more particularly, to transport and storage of items within the material handling systems.

2. Brief Description of Related Developments

Generally the storage of items within, for example, a warehouse requires a large building or storage structure space with an associated footprint. Automated vehicles, also referred to as autonomous rovers, may be used in these warehouses to place items in storage and remove items from storage. The autonomous rovers may include energy storage units that require charging before initial use and during use such as when recharging upon depletion.

It would be advantageous to have a charging system for charging an autonomous rover's energy storage unit. It would also be advantageous to charge an autonomous rover's energy storage unit where the autonomous rover may be transferring material or wherever the autonomous rover may be located.

BRIEF DESCRIPTION OF THE DRAWINGS

The foregoing aspects and other features of the disclosed embodiments are explained in the following description, taken in connection with the accompanying drawings, wherein:

FIGS. 4A-4C are schematic illustrations of an exemplary implementation of a charging system in accordance with aspects of the disclosed embodiment;

DETAILED DESCRIPTION

Figure 1:
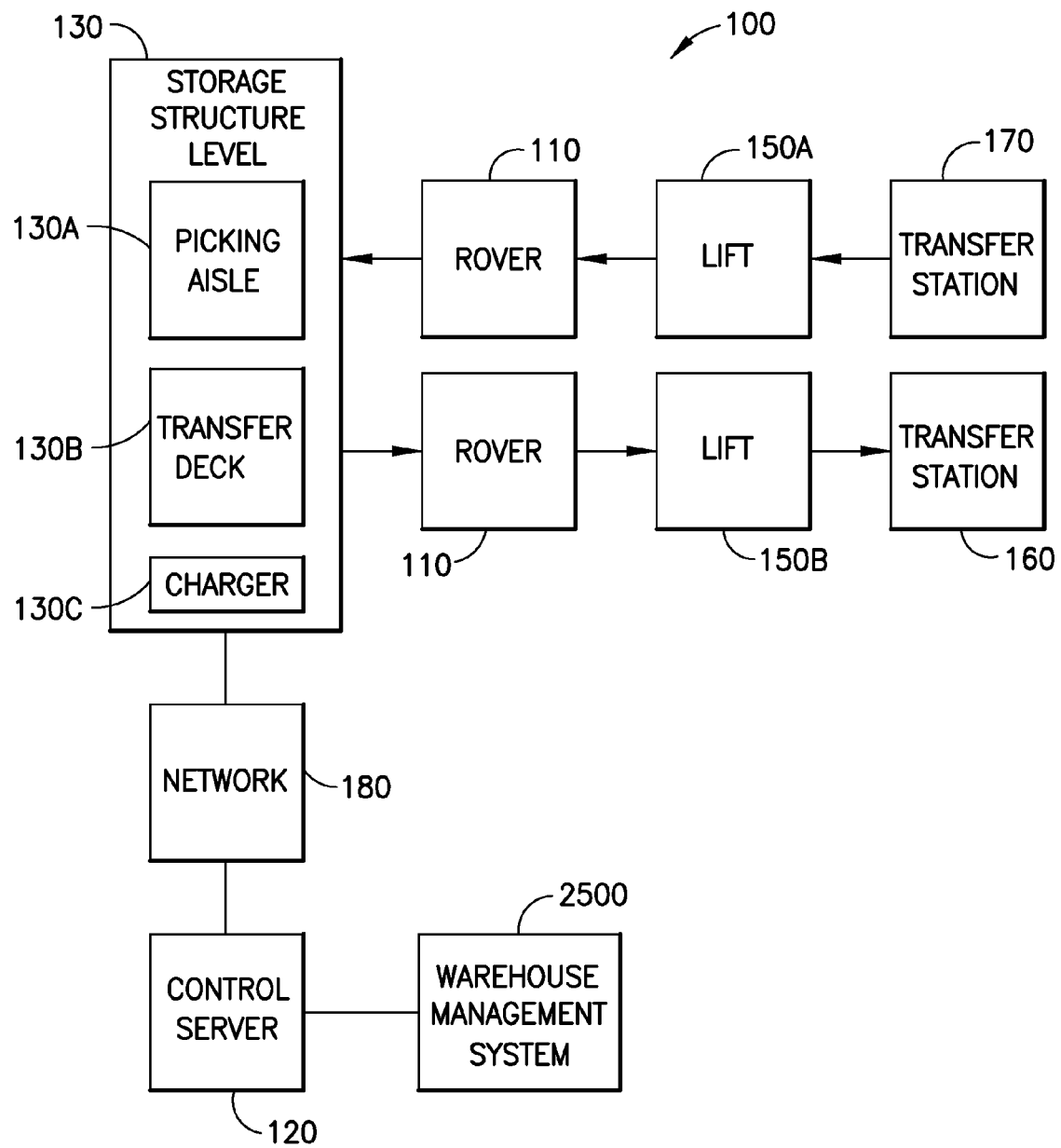
FIG. 1 is a schematic illustration of an automated storage and retrieval system in accordance with aspects of the disclosed embodiment.

FIG. 1 schematically illustrates a storage and retrieval system in accordance with an aspect of the disclosed embodiment. Although the aspects of the disclosed embodiment will be described with reference to the drawings, it should be understood that the aspects of the disclosed embodiment can be embodied in many alternate forms. In addition, any suitable size, shape or type of elements or materials could be used.

In accordance with aspects of the disclosed embodiment, the storage and retrieval system 100 may operate in a retail distribution center or warehouse to, for example, fulfill orders received from retail stores for case units such as those described in U.S. patent application Ser. No. 13/326,674 filed on Dec. 15, 2011, the disclosure of which is incorporated by reference herein in its entirety.

The storage and retrieval system 100 may include in-feed and out-feed transfer stations 170, 160, input and output vertical lifts 150A, 150B (generally referred to as lifts 150), a storage structure 130, and a number of autonomous rovers 110. The storage structure 130 may include multiple levels of storage rack modules where each level includes respective storage or picking aisles 130A, and transfer decks 130B for transferring case units between any of the storage areas of the storage structure 130 and any shelf of the lifts 150. In some aspects, a lift may form a modular unit that may be part of, or an extension of, the transfer deck. The storage aisles 130A, and transfer decks 130B are also configured to allow the autonomous rovers 110 to traverse the storage aisles 130A and transfer decks 130B for placing case units into picking stock and to retrieve ordered case units.

The autonomous rovers 110 may be any suitable autonomous vehicles capable of carrying and transferring case units throughout the storage and retrieval system 100. Suitable examples of rovers can be found in, for exemplary purposes only, U.S. patent application Ser. No. 13/326,674 filed on Dec. 15, 2011; U.S. patent application Ser. No. 12/757,312 filed on Apr. 9, 2010; U.S. patent application Ser. No. 13/326,423 filed on Dec. 15, 2011; U.S. patent application Ser. No. 13/326,447 filed on Dec. 15, 2011; U.S. patent application Ser. No. 13/326,505 Dec. 15, 2011; U.S. patent application Ser. No. 13/327,040 filed on Dec. 15, 2011; U.S. patent application Ser. No. 13/326,952 filed on Dec. 15, 2011; and U.S. patent application Ser. No. 13/326,993 filed on Dec. 15, 2011, the disclosures of which are incorporated by reference herein in their entireties. The autonomous rovers 110 may be configured to place case units, such as the above described retail merchandise, into picking stock in the one or more levels of the storage structure 130 and then selectively retrieve ordered case units for shipping the ordered case units to, for example, a store or other suitable location.

The autonomous rovers 110 and other suitable features of the storage and retrieval system 100 may be controlled by, for example, one or more central system control computers, referred to as control server 120 through, for example, any suitable network 180. The network 180 may be a wired network, a wireless network or a combination of a wireless and wired network using any suitable type and/or number of communication protocols. In one aspect, the control server 120 may include a collection of substantially concurrently running programs that are configured to manage the storage and retrieval system 100 including, for exemplary purposes only, controlling, scheduling, and monitoring the activities of all active system components, managing inventory and pickfaces, and interfacing with the warehouse management system 2500. The collection of substantially concurrently running programs may also be configured to manage an autonomous rover charging system and a charging system health monitoring function according to aspects of the disclosed embodiment. The collection of substantially concurrently running programs may be referred to generally as system software.

The autonomous rovers 110 may require charging, for example, before being placed into service, during operations, and/or after an extended idle time. According to an aspect of the disclosed embodiment, the storage and retrieval system 100 includes a charging system 130C for charging power sources (see e.g. power sources 482, 522, 622, 722 in FIGS. 4A and 5-7) of autonomous rovers 110, 416, 516, 616, 716 at any suitable time. Charging facilities may be located at any suitable location in the storage and retrieval system 100 such as, for example, at one or more of the input and output vertical lifts 150A, 150B, the levels of storage rack modules, the storage or picking aisles 130A, the transfer decks 130B, or at any point where material is transferred to and from the autonomous rovers 110 or any other suitable location of the storage and retrieval system 100 where an autonomous rover may be located.

Figure 2:
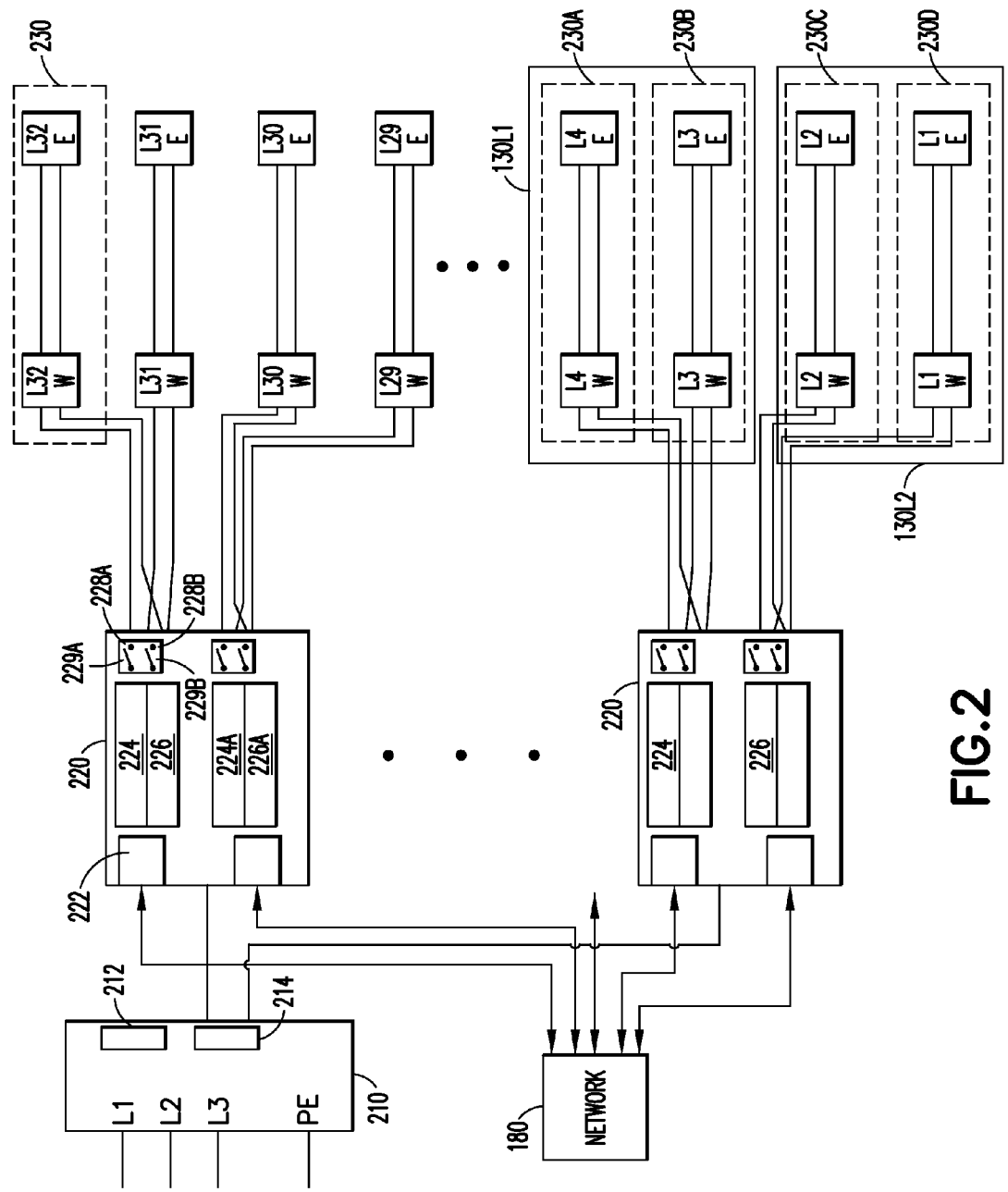
FIG. 2 is a schematic illustration of an autonomous rover charging system in accordance with aspects of the disclosed embodiment.

FIG. 2 shows an exemplary block diagram of a charging system 200 according to aspects of the disclosed embodiment. The charging system 200 may be substantially similar to charging system 130C. The charging system 200 generally includes an alternating current (AC) distribution system 210, at least one charging supply 220, and charging locations 230.

The AC distribution system 210 may provide alternating current to one or more charging supplies 220 and may be capable of supplying enough power to enable all charging supplies 220 in the charging system 200 to operate at full power simultaneously. The AC distribution system 210 may include a main disconnect switch 212 and AC overload and short circuit protection circuitry 214. An individual AC overload and short circuit protection circuit may be provided for each charging supply 220 to furnish fault isolation such that a failed charging supply will not affect operation of other charging supplies. The alternating current may be supplied at any suitable amperage or voltage level. For example, the current may be supplied at 480, 400, 240, 230, 220, or 208 volts, 50 or 60 Hz, in a three phase delta or Y configuration, at any appropriate amperage. While FIG. 2 shows a delta configuration and a four wire L1, L2, L3, protective earth (PE) connection, it should be understood that the aspects of the disclosed embodiments may utilize any suitable configuration such as, for example, a Y configuration with a neutral wire L1, L2, L3, N, PE connection. The alternating current may also be supplied to any suitable location within the storage and retrieval system 100.

The at least one charging supply 220 may include a communications port 222, one or more charging modules 224, 226, and at least one set of contactors 228A, 228B. The communications port 222 may generally provide communications between the control server 120 (FIG. 1) and the charging supply 220 through any suitable network, such as network 180, for enabling in service programming, control, and monitoring of the charging modules 224, 226 and contactors 228A, 228B. The communications port 222 may operate to report any suitable information related to the charging modules 224, 226 such as, for example, an alarm state, enabled or disabled status, status of contactors 228A, 228B, temperature, output current or voltage, voltage or current limits, and/or software version.

The communications port 222 may operate to receive commands such as, for example, commands to enable and disable charging module output, switch charging module output among constant current, constant voltage, or constant power, change current and voltage limits, update software and calibration data, and/or open or close contactors 228A, 228B. The communications port 222 may also be enabled to report failures of the charging modules 224, 226, for example, under voltage, over voltage, over current, over temperature, and no response.

The communications port 222 may be wired and/or wireless and may use any suitable communication technology or protocol. According to an aspect of the disclosed embodiment, the communications port 222 may be a network enabled power supply manager having an Internet Protocol (IP) address on the network 180 (FIG. 1) and having a dedicated bus for communication with charging modules 224, 226.

Figure 13:
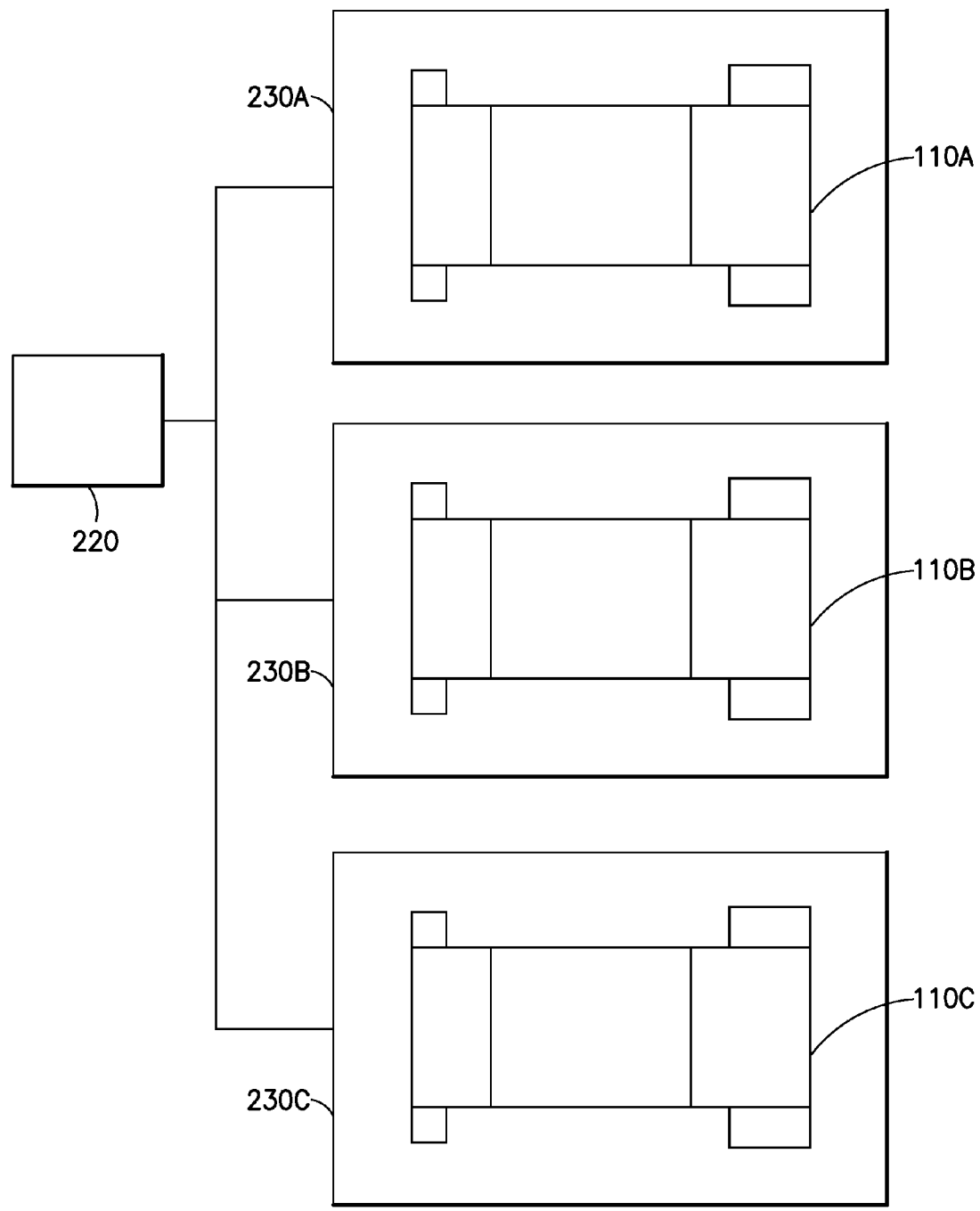
FIG. 13 is a schematic illustration of a charging system in accordance with aspects of the disclosed embodiment.
Figure 14:
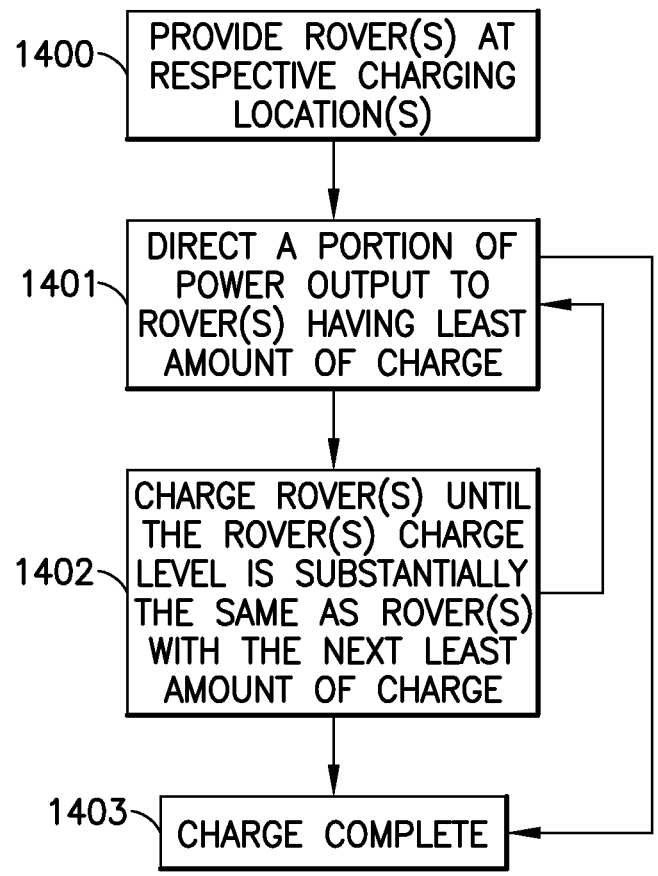
FIG. 14 is a flow diagram in accordance with aspects of the disclosed embodiment.

While charging modules 224, 226 are capable of operating alone, two charging modules may be grouped together in charging supply 220 to produce a combined output. The combined outputs of charging modules 224, 226, may be used to deliver power to one or more charging locations 230. As may be realized, while two charging locations 230 are illustrated in FIG. 2 with respect to charging modules 224, 226 it should be understood that any suitable number of charging modules 224, 226 may be connected to power modules 224, 226 in any suitable manner. As may also be realized, each charging supply 220 may have any suitable number of charging modules 224, 226, 224A, 226A which may be combined to produce a combined output. For example, in one aspect charging modules 224, 226 may have a combined output and charging modules 224A, 226A may have a combined output. In other aspects charging modules 224, 226, 224A, 226A may have a combined output while in still other aspects any two or more of the charging modules 224, 226, 224A, 226A may be combined in any suitable manner to provide a combined output. Each charging location 230 may have a dedicated contactor 228A, 228B. Charging modules 224, 226 (and the other charging modules described herein), may be configured such that upon failure of one charging module 224, 226, the other charging module 224, 226 may be capable of delivering current to the one or more charging locations 230. According to some aspects, the remaining charging module 224, 226 may deliver a reduced amount of current to the charging locations 230. In one aspect, the charging supply 220 (and the other charging supplies described herein) may be controlled in any suitable manner such that power output by the charging supply 220 may be allocated to respective charging locations 230 depending on a level of charge of the autonomous rovers 110 engaged at each charging location. For example, also referring to FIGS. 13 and 14 charging locations 230A, 230B, 230C may be connected to charging supply 220 and a rover 110A, 110B, 110C may be provided or otherwise located at a respective charging location 230A, 230B, 230C (FIG. 14, Block 1400). For exemplary purposes only, rover 110A may have the lowest charge level of the rovers 110A, 110B, 110C. Rover 110C may have the highest charge level and rover 110B may have a charge level between the charge levels of rovers 110A and 110C. In one aspect all or most (or any other suitable portion of) the power output from the charging supply 220 may be allocated to an autonomous rover having the least amount of charge (e.g. such as rover 110A) (FIG. 14, Block 1401) up to the point where the charge of that autonomous rover 110A is substantially equal to a charge of another of the autonomous rovers (e.g. such as rover 110B having the next least amount of charge) at one of the respective charging locations (FIG. 14, Block 1402). Once the charge level of rover 110A is substantially the same as the charge level of rover 110B, autonomous rovers 110A and 110B may receive all or most (or any other suitable portion of) the power output from charging supply 220 (FIG. 14, Block 1401) until their charge is substantially equal to a charge of another autonomous rover (e.g. having the next least amount of charge such as rover 110C) at one of the respective charging locations (FIG. 14, Block 1402) and so on (e.g. continue with loop of FIG. 14, Blocks 1401, 1402) until the charging of the rovers is complete (FIG. 14, Block 1403). If all the rovers 110A, 110B, 110C at the charging locations 230A, 230B, 230C are substantially the same (e.g. have substantially the same level of charge) the power supply 220 may direct power to each of the rovers 110A, 110B, 110C until charging is complete (FIG. 14, Block 1403) or until some other predetermined criteria is met (e.g. a predetermined charge percentage of the rover, a command for a rover to leave the charging location, or any other suitable criteria).

Each charging module 224, 226 (and the other charging modules described herein) may be "hot pluggable" meaning that each charging module 224, 226 may be replaceable without power cycling the charging module 224, 226 being replaced and/or without power cycling the charging supply in which the charging module 224, 226 is located. The "hot pluggable" replacement of the charging module 224, 226 may be done without affecting the operation of any other charging modules and while the charging locations 230 are active. Each charging module 224, 226 may be capable of switching between a constant current, constant voltage, or constant power output mode. In one aspect switching between different output modes may be controlled in any suitable manner such as by commands received from communications port 222. In another aspect switching between different output modes may be affected automatically by the charging module. In still other aspects switching between different output modes may be controlled by a rover 110 and/or the control server 120.

The charging system 200 may include any number of charging supplies 220. A charging supply 220 may include any number of charging modules 224, 226 and may be capable of supplying any number of charging locations 230 on any number of storage levels. For example, a charging supply 220 may include two charging modules 224, 226 and may provide power to four charging locations 230 where two charging locations are disposed on each of two levels served by a vertical lift 150A or 150B. For example, referring to FIG. 2, charging locations 230A, 230B may be located on level 130L1 of the storage structure 130 while charging locations 230B, 230C may be located on level 130L2 of the storage structure 130.

The charging modules 224, 226 may be configured with outputs that are enabled when an autonomous rover 110 both accesses and de-accesses charging contacts 816, 818 of a charging pad 810 (FIG. 8A) located at a respective charging location 230 (e.g. where the charging contacts 816, 188 are connected to the charging modules 224, 226) to maximize a charging duty cycle and minimize charging delays. The charging supply 220 may have several different operating modes including, for example, an operating mode where all contactors 228A, 228B are disabled, an operating mode where all contactors 228A, 228B are enabled, and/or an operating mode where a single or more than one contactor 228A, 228B is disabled. Upon power up, the charging supply 220 may initialize with contactors 228A, 228B disabled and open. The communication port 222 may enable the contactors 228A, 228B after receiving a command from a charging system health monitoring function system software, or for example, control server 120. Each contactor 228A, 228B may have an auxiliary contact 229A, 229B, respectively which may be monitored to determine the state of the respective contactor 228A, 228B. During normal operations, the contactors 228A, 228B may be closed, energizing the charging pads 810 at the charging locations 230. The closed state of the contactors 228A, 228B may be verified by monitoring the auxiliary contacts 229A, 229B. For maintenance access, a single contactor, e.g. 228A or 228B may be disabled so that no current flows through the associated charging location 230. This may be verified in any suitable manner such as by monitoring auxiliary contact 229A, 229B. As may be realized, and as noted above, each charging supply may have any suitable number of contactors 228A, 228B connected to any suitable number of charging locations 230 such that any one or more of the contactors 228A, 228B may be disabled for providing maintenance access to any suitable number of charging locations 230.

According to some aspects, charging modules 224, 226 may be configured to charge any suitable power source, such as power sources 482, 522, 622, 722 (FIGS. 4A and 5-7) disposed on an autonomous rover including a battery pack and/or a capacitor based power source such as, for example, an ultracapacitor bank including one or more ultracapacitors. It is noted that the power sources 482, 522, 622, 722 are illustrated as ultracapacitors but in other aspects the power sources may be any suitable power sources.

Figure 3:
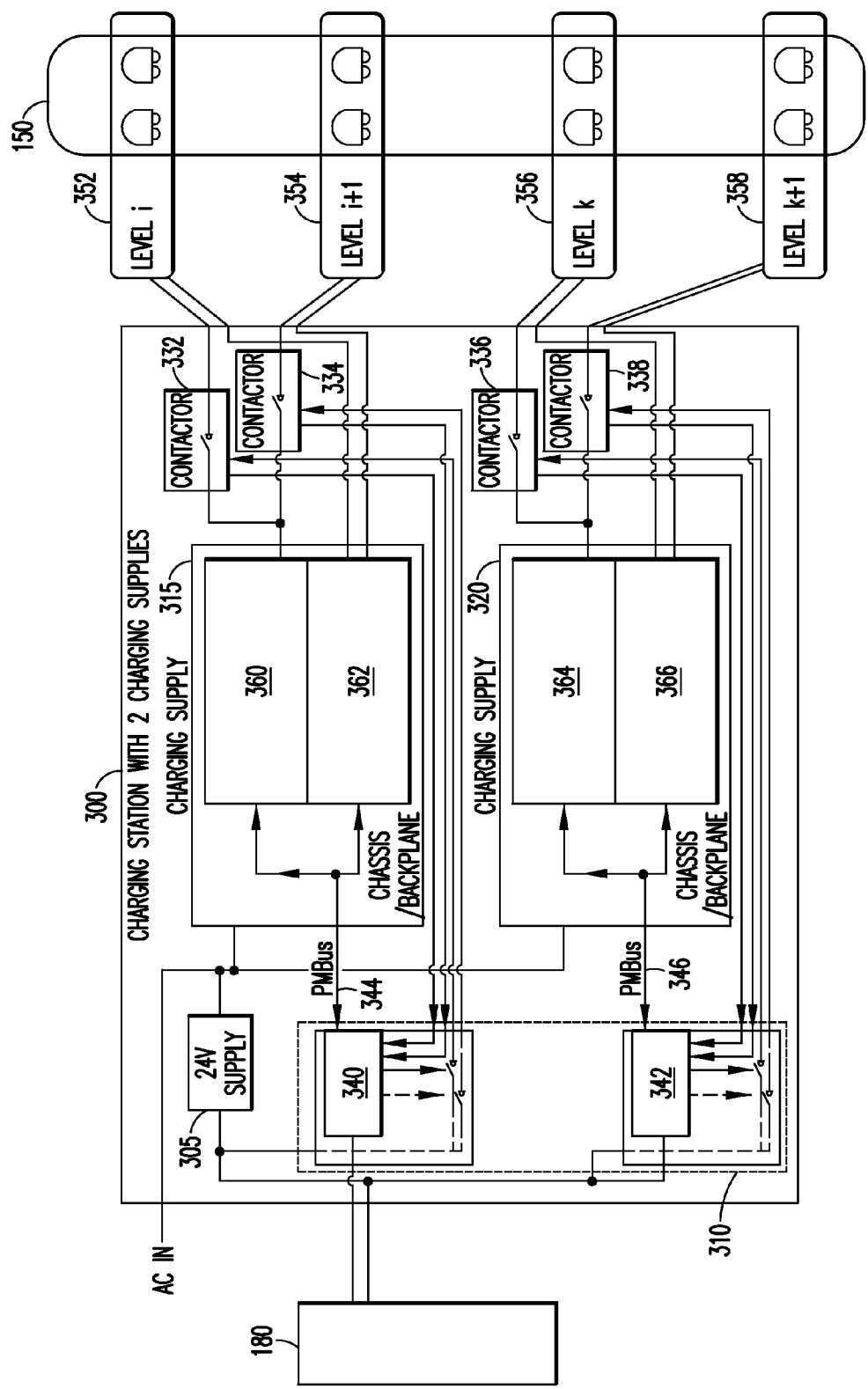
FIG. 3 is a schematic illustration of an exemplary charging station in accordance with aspects of the disclosed embodiment.

FIG. 3 shows a schematic illustration of an exemplary charging station 300 in accordance with aspects of the disclosed embodiment. The charging station 300 may be disposed at any suitable location of the storage and retrieval system 100. In one aspect the charging station 300 may include an internal power supply 305, a communications port 310, two charging supplies 315, 320, and four contactors 332, 334, 336, 338, each providing charging facilities to charging pads 810 (FIG. 8A) disposed at charging locations which may be located at different levels 352, 354, 356, 358, respectively, of the storage structure 130. In other aspects the charging station 300 may have any suitable configuration.

In this exemplary aspect, communications port 310 may be implemented as a dual Ethernet gateway (e.g. having two Ethernet gateways 340, 342) with at least one power supply management bus 344, 346 capable of controlling one or more charging modules 360, 362, 364, 366. Each Ethernet gateway 340, 342 may have any suitable configuration and include a media access control (MAC) address chip and an assigned IP address on network 180 (FIG. 1). As a result, each charging supply 315, 320 may have an Ethernet address or be identified on network 180 in any suitable manner. In one aspect there may be two power supply management busses 344, 346 (in other aspects any suitable number of power supply management busses may be provided) that may conform, for example, to the Power Management Bus (PMBus) standard. Each power supply management bus 344, 346 may control any suitable number of charging modules 360, 362, 364, 366. In this example, power supply management bus 344 may be connected to charging modules 360, 362 and power supply management bus 346 may be connected to charging modules 364, 366.

Each charging supply 315, 320 may be substantially similar to that described above and include one or more charging modules 360, 362, 364, 366, grouped together, for example, in pairs, with each pair providing a shared output. In other aspects the one or more charging modules may be grouped together in any suitable manner. Each charging module 360, 362, 364, 366 may be hot pluggable as described above, and may be capable of switching between a constant current, constant voltage, or constant power output mode, as described above and as controlled by commands from communications port 310, affected automatically by each charging module, controlled by a rover 110, or controlled by the control server 120.

FIG. 4A is a schematic illustration of an exemplary implementation of a charging system 400 for charging the rover power source 482 in accordance with aspects of the disclosed embodiment. Charging system 400 includes an AC distribution system 210, one or more charging stations 410, an intermediate DC bus 412, and a charging interface 414 connected to a charging pad 450 with contacts 816, 818 (similar to charging pad 810 in FIG. 8A) that interface with an autonomous rover 416 (which may be substantially similar to rover 110 described above). The charging interface 414 may include, for example, a floor mounted charging pad 450 with charging contacts 816, 818 (FIG. 8A) and a rover mounted charging pad 452 (similar to charging pad 820 in FIG. 8A). The charging pads 450, 452 may interface or engage each other in any suitable manner such as that described below with respect to FIGS. 8A and 8B. In some aspects, the voltage present on the intermediate DC bus 412, and hence the voltage present on the charging contacts 816, 818, may be considered extra low voltage and may require less protection, or in some aspects, no protection, against electrical shock.

Charging stations 410 may include any suitable number of charging modules 440, 442 (which may be substantially similar to those charging modules described above), generally configured in groups of two (or in groups of any suitable number of charging modules) with combined outputs for delivering charging power to one or more autonomous rovers 416. A group of any number of charging modules with combined outputs for delivering power may be referred to as a charging supply (see e.g. charging supplies 220, 315, 320 described above).

Figure 8A:
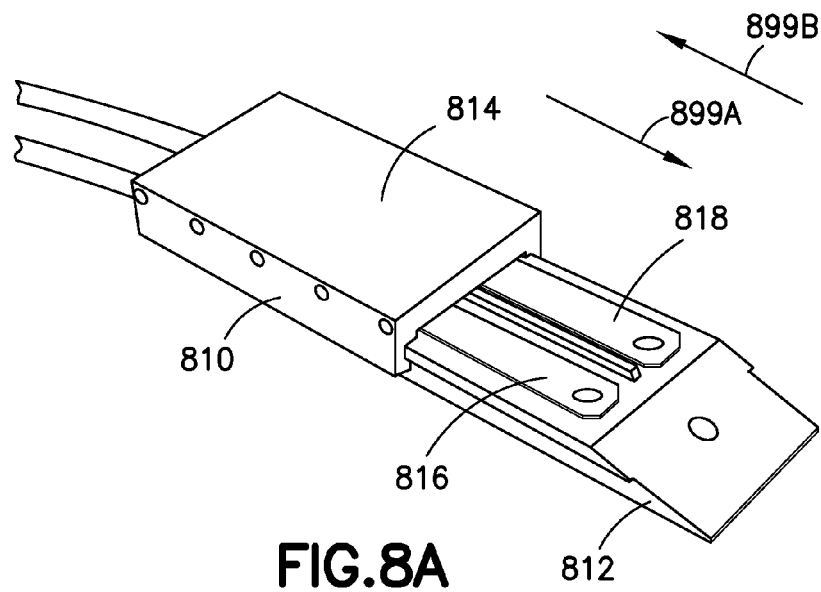
FIGS. 8A and 8B are schematic illustrations of an exemplary set of charging pads in accordance with aspects of the disclosed embodiment.
Figure 8B:
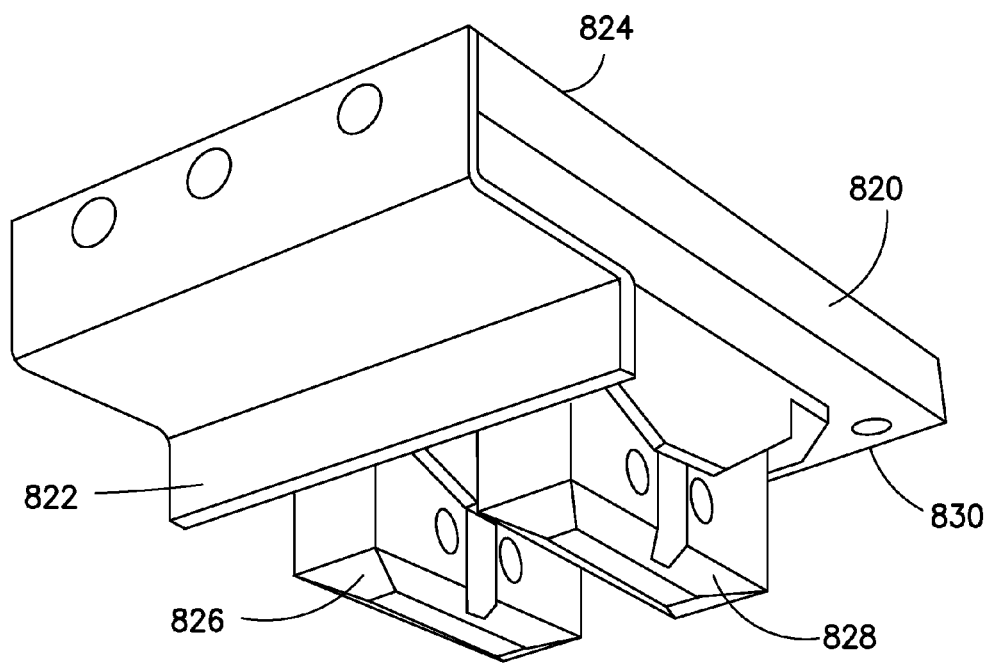

The rover 416 may include what may be referred to as "hot swap" circuitry 418 or other suitable protection circuitry configured to allow the rover 416 to connect to an energized or otherwise enabled charging pad 450 (e.g. "hot swap" refers to the autonomous rover's ability to make and break contact, such as contact between the charging pad contacts 816, 818 and the rover charging contacts 826, 828 of charging interface 414, while the charging pads 450 are energized—see FIGS. 8A and 8B). As shown in FIG. 4B, the hot swap circuitry 418 may include current inrush limitation circuitry 422, reversal protection circuitry 424, and charging control circuitry 426. The current inrush limitation, charging control, and reversal protection circuitry may be implemented in any suitable manner such as, for example, under control of an autonomous rover controller 420. The reversal protection circuitry 424 may also be implemented, for example, using one or more Field Effect Transistors (FET's) or in any other suitable manner. The autonomous rover controller 420 may provide commands to the hot swap circuitry 418, for example, to set current inrush limits and/or enable or disable rover charging. As a result, whether charging of the rover is on or off is controlled locally on the rover 416 so that no control loop with the charging station 410 or the control server 120 is required (e.g. enabling or disabling charging of a rover is controlled by the rover 416 independent of the charging station 410 and control server 120).

As shown in FIG. 4C, the autonomous rover controller 420 may include a processor 430, a memory 432, and a communications interface 434. The communications interface 434 may generally provide communications between the control server 120 (FIG. 1) and the autonomous rover 416 at least for controlling rover operations, providing information about charging supplies and charging modules, and/or controlling charging supply and charging module operations.

It should be noted that each charging module 440, 442 in charging system 400 may be configured to switch between a constant current, constant voltage, and/or constant power output mode in a manner substantially similar to that described above. As also noted above, in one aspect switching between different output modes may be controlled in any suitable manner such as by commands received from communications port 222. In another aspect switching between different output modes may be affected automatically by the charging module. In still other aspects switching between different output modes may be controlled by a rover 110 and/or the control server 120.

It should also be noted that the autonomous rover 110, 416 entry to a charging location 230 that, for example includes, charging interface 414, is decoupled or independent from a status of the charging station 410, a status of the charging location and/or a status of the charging interface 414. The autonomous rover controller 420 may control the hot swap circuitry 418 and the output of charging station 410 to effect charging of the autonomous rover power source, regardless or otherwise independent of the charging station 410 status, charging location 230 status or charging interface 414 status before and/or after contact is made (e.g. when the rover 110, 416 accesses and de-accesses the charging interface 414) between charging contacts 816, 818 (FIG. 8A) of the rover 110, 416 and charging contacts 826, 828 (FIG. 8B) of the charging interface 414. In at least one aspect of the disclosed embodiment, an output of a charging supply, such as charging supply 220, 315, 320, is enabled when the rover 110, 416 accesses and de-accesses the charging contacts 826, 828 of the charging pad 450 of the charging interface 414. The autonomous rover controller 420 may also control the output of charging station 410 to change a state of the charging interface 414 between safe and unsafe (e.g. un-energized and energized, respectively) to effect a hot swap entry and departure of the autonomous rover 110, 416 with respect to a charging location 230.

As mentioned above, charging locations 230 may be located at any suitable location in the storage and retrieval system 100 where material is transferred to and from the autonomous rover 110 or at any other suitable location at which the autonomous rover 110 may be disposed. It should be understood that autonomous rover charging may be accomplished while an autonomous rover 110 is transferring material to and from the autonomous rover 110. It should also be understood that the rover entry to a material transfer location, such as at lift 150A, 150B location, in a picking aisle or any other suitable transfer location, with simultaneous charging under rover control is independent of communication between the control server 120 and the rover communication interface 434 (e.g. independent of the control server commands). It should further be understood that an autonomous rover 110 does not need clearance from the control server 120 or any other system component to effect a charging operation, or for entry onto a charging pad, as long as entry to the charging pad is not blocked, for example, by another rover.

Figure 5:
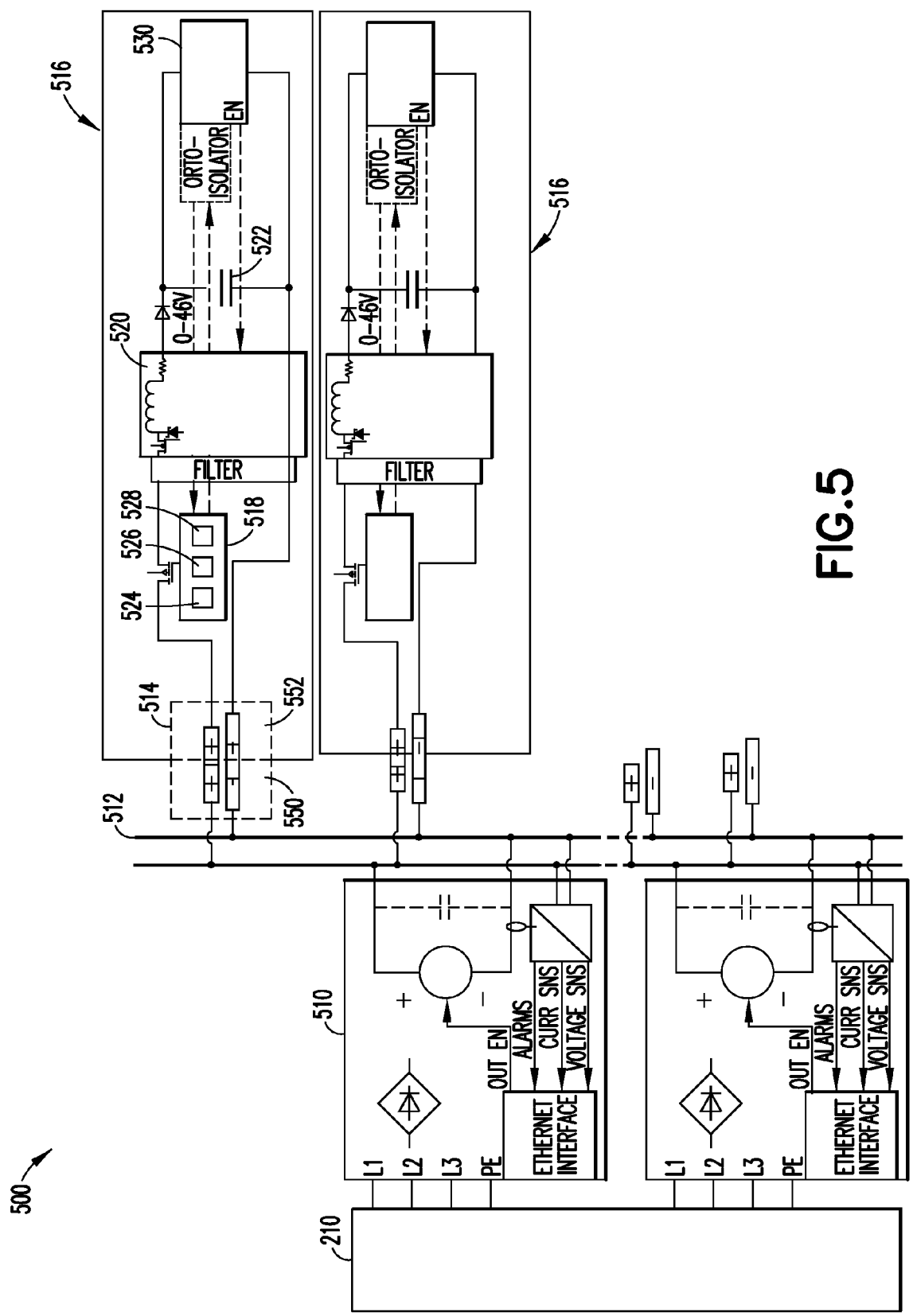
FIG. 5 is a schematic illustration of an exemplary implementation of a charging system in accordance with aspects of the disclosed embodiment.

FIG. 5 shows a schematic illustration of another exemplary implementation of a charging system 500 in accordance with aspects of the disclosed embodiment. Charging system 500 includes AC distribution system 210, at least one DC power supply 510, an intermediate DC bus 512, and at least one charging interface 514 (substantially similar to that described above) with a charging pad 550 (that is substantially similar to charging pad 450 described above) having contacts 816, 818 (FIG. 8A) that interface with an autonomous rover 516 (that is substantially similar to rovers 110, 416 described above). The charging interface 514 may include, for example, the floor mounted charging pad 550 and a rover mounted charging pad 552 (substantially similar to rover mounted charging pad 452 described above).

According to some aspects, the autonomous rover 516 may include hot swap circuitry 518 (substantially similar to that described above) and a charging supply 520 for charging a power source 522. According to other aspects, the voltage present on the intermediate DC bus 512 may be considered high voltage and all components used in the intermediate DC bus and connected to the voltage of the DC bus, or components that may be connected to the DC bus voltage in a single fault case, must be made finger safe, for example, protected against finger contact or solid foreign bodies, typically using an insulating barrier having an opening of 12 mm or less. In some aspects this may include the charging pads 550 where the charging pads are configured in any suitable manner to be finger safe.

The hot swap circuitry 518 may include current inrush limitation circuitry 524, reversal protection circuitry 526, and charging control circuitry 528, similar to hot swap circuitry 418 (FIG. 4). The hot swap circuitry 518 may be under control of the autonomous rover controller 530. According to some aspects, the autonomous rover 516 includes a rover charging supply 520. The rover charging supply 520 may be similar to charging supply 220, and may be capable of switching between a constant current, constant voltage, or constant power output mode. Switching of the charging supply 520 between different output modes may be controlled by commands received from the autonomous rover controller 530, may be affected automatically by the rover charging supply 520, and/or may be controlled by the control server 120. In at least one aspect of the disclosed embodiment, an output of the charging supply 520 is enabled when the rover accesses and de-accesses the charging contacts in a manner substantially similar to that described above.

Figure 6:
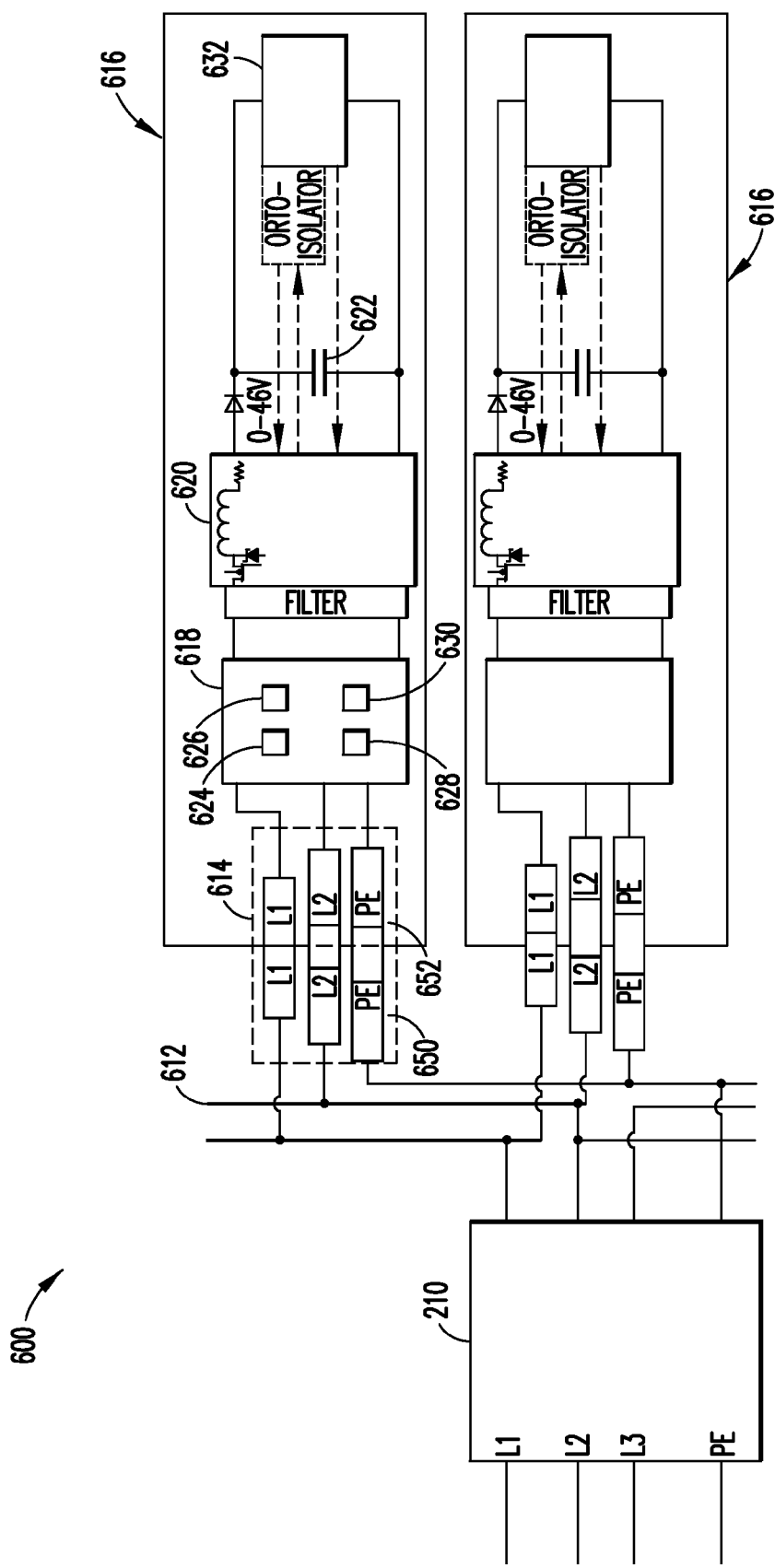
FIG. 6 is a schematic illustration of an exemplary implementation of a charging system in accordance with aspects of the disclosed embodiment.

FIG. 6 shows a schematic illustration of another exemplary implementation of a charging system 600 in accordance with aspects of the disclosed embodiment. Charging system 600 includes AC distribution system 210, an intermediate AC bus 612, and at least one charging interface 614 (that may be substantially similar to those described above) with a charging pad 650 (substantially similar to that described above) having any suitable number of contacts substantially similar to contacts 816, 818 (FIG. 8A) that interface with an autonomous rover 616 (which may be substantially similar to those described above). The charging interface 614 may include, for example, the floor mounted charging pad 650 and a rover mounted charging pad 652 (substantially similar to the rover mounted charging pads described above). Similar to the aspects shown in FIG. 5, the voltage present on the intermediate AC bus 612 may be considered high voltage and all components used in the intermediate AC bus and connected to the voltage of the AC bus, or components that may be connected to the AC bus voltage in a single fault case, must be made finger safe.

According to some aspects, the number of contacts in charging interface 614 may be determined by the type of AC power provided by the intermediate AC bus 612. For example, a delta configuration with four wire L1, L2, L3, and PE connections may have three contacts as shown in FIG. 6, or a Y configuration with neutral wire L1, L2, L3, N, and PE connections may have four contacts.

According to other aspects, the autonomous rover 616 may include rectifier and hot swap circuitry 618 and a charging supply 620 for charging a power source 622. The rectifier and hot swap circuitry 618 may include circuitry 624 for rectification of power received from the intermediate AC bus 612, current inrush limitation circuitry 626, reversal protection circuitry 628, and charging control circuitry 630.

The rectifier and hot swap circuitry 618 may operate under control of the autonomous rover controller 632 or in any other suitable manner. Similar to the aspects shown in FIG. 5, the autonomous rover 616 includes a rover charging supply 620 (that may be substantially similar to those described above), which may be capable of switching between a constant current, constant voltage, and/or constant power output mode as controlled by the autonomous rover controller 632 and/or the control server 120. In at least one aspect of the disclosed embodiment, an output of the charging supply 620 is enabled when the rover accesses and de-accesses the charging contacts of the charging pad 650 in a manner substantially similar to that described above.

Figure 7:
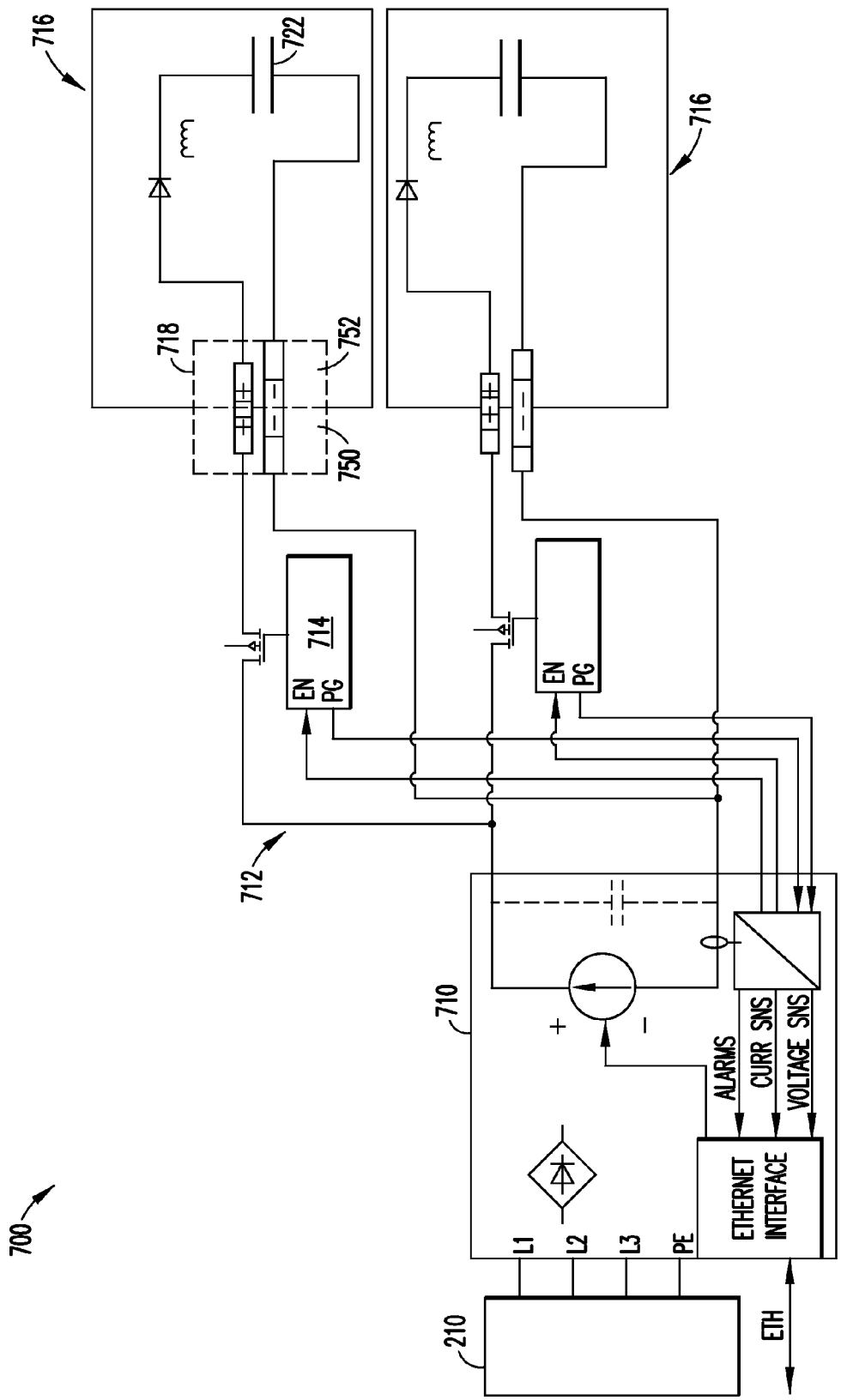
FIG. 7 is a schematic illustration of an exemplary implementation of a charging system in accordance with aspects of the disclosed embodiment.

Another exemplary implementation of a charging system 700 in accordance with aspects of the disclosed embodiment is shown in FIG. 7. This exemplary charging system 700 includes AC distribution system 210, at least one DC power supply 710, an intermediate DC bus 712, hot swap circuitry 714, and at least one charging interface 718 (that may be substantially similar to those described above) with a charging pad 750 having contacts 816, 818 (FIG. 8A) that interface with an autonomous rover 716 (which may be substantially similar to those described above). The charging interface 718 may include, for example, the floor mounted charging pad 750 and a rover mounted charging pad 752 (that may be substantially similar to those described above).

The DC power supply 710 may be substantially similar to those described above and may be capable of switching between a constant current, constant voltage, and/or constant power output mode in a manner similar to that described above. In a manner similar to that described above, switching between different output modes may be affected automatically, may be controlled by commands received from a controller of the autonomous rover 716, and/or may be controlled by the control server 120. In some aspects of the disclosed embodiment, an output of the DC power supply 710 is enabled when the rover 716 accesses and de-accesses the charging contacts of the charging pad 750 in a manner substantially similar to that described above.

According to some aspects, the voltage present on the intermediate DC bus 712 may be considered high voltage and all components used in the intermediate DC bus and connected to the voltage of the DC bus, or components that may be connected to the DC bus voltage in a single fault case, must be made finger safe. In other aspects, the voltage present on the intermediate DC bus 712 may be considered extra low voltage and may require less protection against shock.

Exemplary aspects of components of the charging interface 414, 514, 614, 718 are shown in FIGS. 8A and 8B. FIG. 8A shows an example of a floor mounted charging pad 810. The floor mounted charging pad 810 may include a base 812 which may be mounted on a floor of the storage structure 130 or wherever a charging location 230 may be located. A movable cover 814 may be provided which may be biased in the direction of arrow 899A in a closed position, such that the movable cover 814 is disposed over the contacts 816, 818 of the charging pad 810. In other aspects, a cover may not be provided on the charging pad 810. According to some aspects, contact 816, which may be connected to a negative DC voltage of a respective power supply, may have a longer length than contact 818, which may be connected to a positive DC voltage of a respective power supply, in order to facilitate the negative contact 816 being engaged both first and last as the rover drives on and off the charging pad 810. An exemplary rover mounted charging pad 820 is shown in FIG. 8B. The rover mounted charging pad 820 may include rover charging contacts 826, 828 mounted, for example, on an underside 830 of the rover mounted charging pad 820. The rover mounted charging pad 820 may be mounted, for example, to an underside of an autonomous rover for establishing a mating relationship with the floor mounted charging pad 810. In some aspects, the rover mounted charging pad 820 may be mounted with a cover pusher 822 or other suitable member for moving the cover 814 in the direction 899B as the rover moves relative to the floor mounted charging pad 810 to expose contacts 816, 818 of the floor mounted charging pad 810 for effecting an electrical connection between the charging pads 810, 820. In other aspects, a cover pusher may not be provided. As may be realized, when the rover disengages the floor mounted charging pad, relative movement between the rover (e.g. the cover pusher 822) and the floor mounted charging pad 810 may allow the biasing force on the cover 841 to move the cover 841 in the direction of arrow 899A so that the contacts 816, 818 are covered. In still other aspects, hot swap circuitry 418, 518, or rectifier and hot swap circuitry 618 may be mounted on a top side 824 of the rover mounted charging pad 820.

As mentioned above, an autonomous rover controller 420, 530, 632, may control charging of its onboard power source and/or each of the charging modules within each charging supply. According to some aspects, the autonomous rover controller 420, 530, 632, may be configured to effect different charging modes for the autonomous rover power sources describe above such as, for example, power sources 482, 522, 622, 722. It should be understood that the specified voltage and current levels described are exemplary and may vary, for example, according to the state of the power source being charged and the time available for charging. The charging modes may include a pre-charge mode, a force charge mode, charge enabled and disabled modes, full, quick, and incomplete charge modes, and a trickle charge mode. According to some aspects, all modes except the pre-charge mode may require that the autonomous rover controller 420, 530, 632 be active.

It should also be understood that when more than one autonomous rover is being charged simultaneously (as described above), in some aspects, all or most of the current may be supplied to the rover with the lowest power source voltage until the power source voltage rises to that of a rover having a next lowest power source voltage, at which point current will be shared between the charging rovers.

The pre-charge mode is used for a fully depleted power source, for example, after shipping with shorted power source terminals. The pre-charge mode may provide a constant current at, for example, any suitable amperage such as approximately 5 A while the power source voltage increases from approximately 0V to any suitable predetermined voltage such as approximately 18V.

The force charge mode may be activated if the output of the power source exceeds any suitable voltage such as, for example, approximately 14V. In the force charge mode, charging may be activated at any suitable constant full current such as, for example, approximately 110 A or any other suitable current.

A charge disabled mode may be activated when the rover power source voltage is within normal operating limits and the autonomous rover controller determines that no charge is required. In other aspects, the charge disabled mode may be activated at any suitable time.

A charge enabled mode may be activated when the rover power source voltage is within normal operating limits and charging is required as determined by the autonomous rover controller. In other aspects, the charge enabled mode may be activated at any suitable time.

The autonomous rover controller may activate a full charge mode at a constant voltage in order to fully charge the rover power source to a predetermined value such as, for example, to approximately 99.3% (to account for power source voltage minus diode drop) of a predetermined full charge value. In other aspects, the full charge mode may be activated at any suitable time.

A quick charge mode may be activated where a constant current charge is followed by a constant voltage charge but charging is terminated before a full charge state is complete. This mode may provide a sufficient charge level to allow the rover to complete at least one task assigned to the rover. The quick charge mode may be activated at any suitable time.

The autonomous rover controller may activate an incomplete charge mode when a rover is only required to complete a predetermined assigned task. In this mode charging may be terminated before completion, as soon a required energy level to perform the assigned task is achieved. The available energy for the assigned task may be estimated from the charge voltage or determined in any other suitable manner.

The autonomous rover controller may also activate, at any suitable time, a trickle charge mode where the rover power supply is charged with a relatively low current over an extended period of time.

Figure 9:
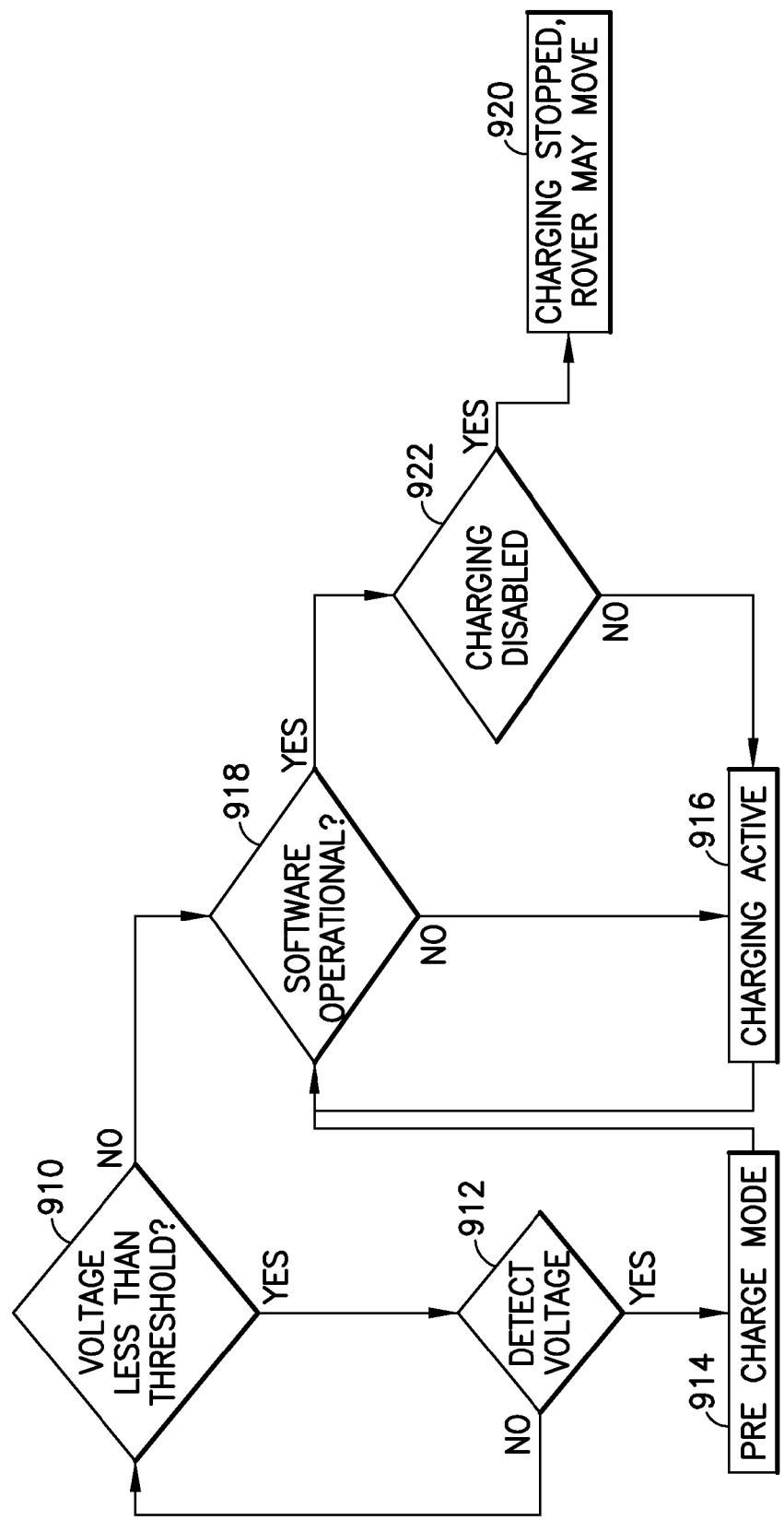
FIG. 9 illustrates different charging modes for an autonomous rover in accordance with aspects of the disclosed embodiment.

FIG. 9 shows an exemplary progression among different charging modes. Referring to item 910, if the rover power source voltage is less than any suitable predetermined threshold, for example, approximately 14-18V, the voltage of the charging supply may be detected in any suitable manner such as by the a sensor or meter in the charging supply, by control server 120 and/or by the rover controller as shown in item 912. If the voltage of the charging supply exceeds any suitable predetermined voltage such as, for example, 30V, the rover may enter the pre-charge mode 914 which provides, for example, any suitable constant current such as, for example, approximately 5 A between any suitable voltage levels such as approximately, 0V and 18V. Pre-charging mode may end when the rover power source reaches a predetermined voltage such as, for example, approximately 18V, or if a force charge mode is activated, as shown in item 916.

The force charge mode 916 may be activated upon the output of the power source reaching a suitable voltage such as, for example, approximately 14V-18V during the pre-charge mode. In the force charge mode, charging may be activated at for example, full current, or any suitable current such as approximately 110 A. The force charge mode 916 may be terminated after the rover software is operational, as shown in item 918, and a bit is set in a register in the autonomous rover controller, shown as item 922 and as explained below.

When the rover software is operational and the power source voltage is within normal operating limits (for example, approximately 25V to 46.3V or any other suitable voltage range), charging may be disabled under the control of the software running on the rover by setting a bit in a complex programmable logic device (CPLD) register in the autonomous rover controller or in any other suitable location of the controller, as shown in item 922. As shown in item 920, charging may stop within any suitable time period such as, for example, approximately 1 ms (could be more or less than 1 ms) and the rover may move after verifying the bit setting in the register and upon instruction from the control server. After charging has been disabled and the rover may leave the charging location with no risk of arcing on loss of pad contact or bounce.

Figure 10:
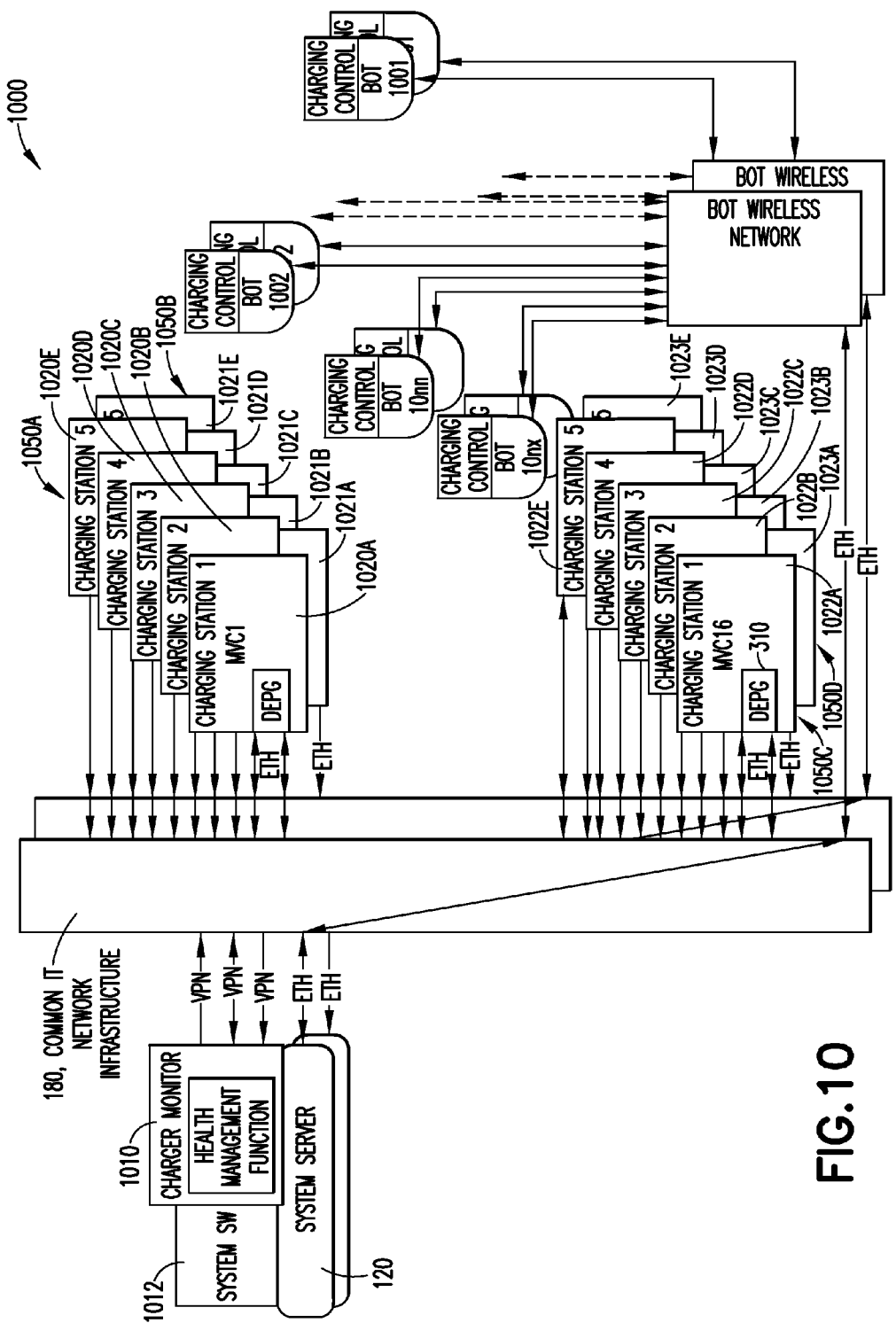
FIG. 10 is a schematic illustration of a control system for controlling an autonomous rover charging system in accordance with aspects of the disclosed embodiment.

FIG. 10 is a schematic illustration of a control system 1000 for controlling an autonomous rover charging system in accordance with aspects of the disclosed embodiment. The control system 1000 includes charger monitor software 1010 which according to some aspects, may reside in a memory of control server 120. According to other aspects, the charger monitor software 1010 may reside in a memory of an autonomous rover controller such as controllers 420, 530, 632 described above. It is noted that the controller/control server where the software resides includes suitable structure for executing the software such that the controller/control server is configured to perform or otherwise execute the software functions as described herein. The charging control system 1000 may provide for monitoring of the state of each charging station, changing the state of each charging station individually under software control, terminating operation of one or more charging supplies and disconnecting power to one or more sets of charging pads to allow maintenance access to a charging location. In this example, the charging stations 1020A-1020E, 1021A-1021E, 1022A-1022E, 1023A-1023B are disposed at respective lift 1050A, 1050B, 1050C, 1050D locations, where the lifts 1050A, 1050B, 1050C, 1050D are substantially similar to one or more of lifts 150A, 150B described above. In this aspect a single or common control system 1000 is illustrated for the charging stations 1020A-1020E, 1021A-1021E, 1022A-1022E, 1023A-1023B but in other aspects there may be more than one control system (similar to control system 1000) where each control system is connected to any suitable number of charging stations. For example, charging stations 1020A-1020E and 1021A-1021E may be connected to a common control system while charging stations 1022A-1022E are connected to a separate control system and charging stations 1023A-1023E are connected to yet another control system.

As described above, a group of charging supplies, for example, in charging stations 220 and 300 each have a communications port 222 and 310, respectively, for communication with the network 180.

The control system may also include a System Health Monitoring Function (HMF) as part of the charger monitor software 1010. The HMF may correlate information from the various autonomous rovers, charging supplies, and charging locations to determine the status of various components of the charging system. As an example only, a charging supply may be visited by some number of rovers, each rover will visit some number of charging supplies, and a set of charging pads will be used by some number of rovers. Synthesizing this information along with any other suitable information, for example, a level of charge for each rover, may enable, for example, identification of charging supplies in need of maintenance or calibration, a precise determination of a capacitance for each rover, tracking of degradation or anomalies of the charging system for accurate charging decisions, precise statistical estimates of an average energy per assigned task for each rover, comparison of charging contactor properties, effective maintenance of the system, preemptive identification of rovers in need of maintenance, and any other suitable task.

The HMF may include continuous monitoring of one or more autonomous rovers 110. An autonomous rover 110 may utilize the communication interface to provide various operational parameters to the HMF such as, for example, time stamped power source voltage levels, allowing the HMF to determine an average energy consumption of the rover 110. Each rover 110 may continuously monitor its power source voltage while charging, for example, at any suitable time interval such as approximately at least 2 times per second and may disable charging and raise a warning (e.g. sends any suitable message to any suitable controller such as system/control server 120) if the power source voltage exceeds a predetermined value. If several rovers 110 raise the same warning for the same charging station, that station may need calibration or other maintenance. While an autonomous rover might still be able to use that charging station because of an ability of the rover to detect overvoltage the charger monitor software 1010 may cause the charging station to be disabled.

The HMF may also provide a continuous monitoring function to the charger monitor software 1010. For example, the HMF may continuously apprise the charger monitor software 1010 of the health of the charging system and allow for intelligent decisions regarding when to enable or disable chargers to minimize potentially damaging situations. The HMF may collect and report health information for each charging station that includes charger timeouts, trips and over temperature. If, for example, over temperature or trip events exceed some predetermined number at a charging location within a predetermined time period, then the charger monitor software 1010 HMF may disable charging at that location. The HMF may periodically fetch and report any suitable error and warning words from the charging stations, supplies, and modules. The charger monitor software 1010 response to these error and warning words may include instructing charging modules to automatically disable outputs if one or more conditions are detected. During normal operations the charger monitor software 1010 generally enables charging supply outputs.

The charger monitor software may also determine a minimum time for rovers to charge. For example, in one aspect the charger monitor software 1010 may give every rover a minimum time to charge based upon an average charge time/job multiplied by some predetermined factor. Such a charging scheme may have rovers fully charged to any suitable predetermined working voltage such as, for example, approximately 46V, be tolerant of dead power supplies, and substantially eliminate use of the incomplete charge mode. In another aspect, the charger monitor software 1010 may compute how much charge time is needed for the rover based upon, for example, at least one or more of capacitance and voltage levels and routing information.

Figure 11:
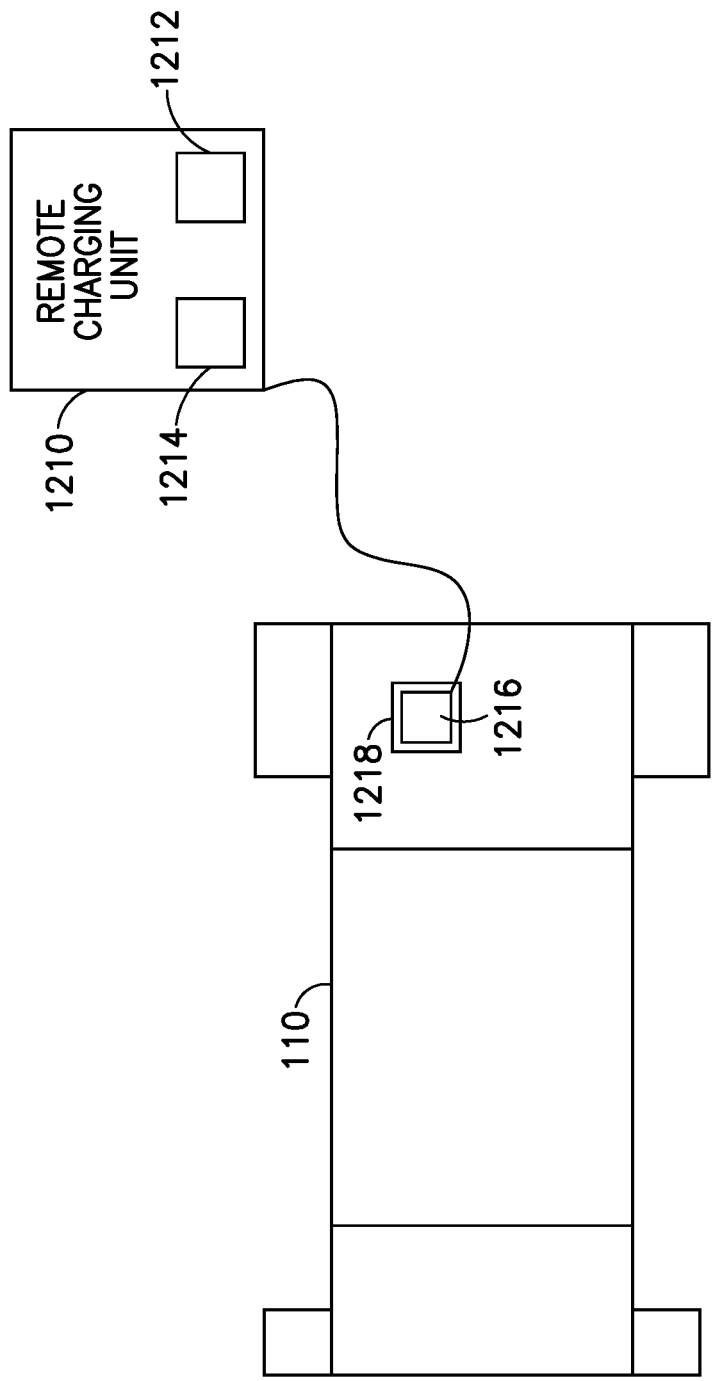
FIG. 11 is a schematic illustration of a system using a transportable charger in accordance with aspects of the disclosed embodiment.
Figure 12:
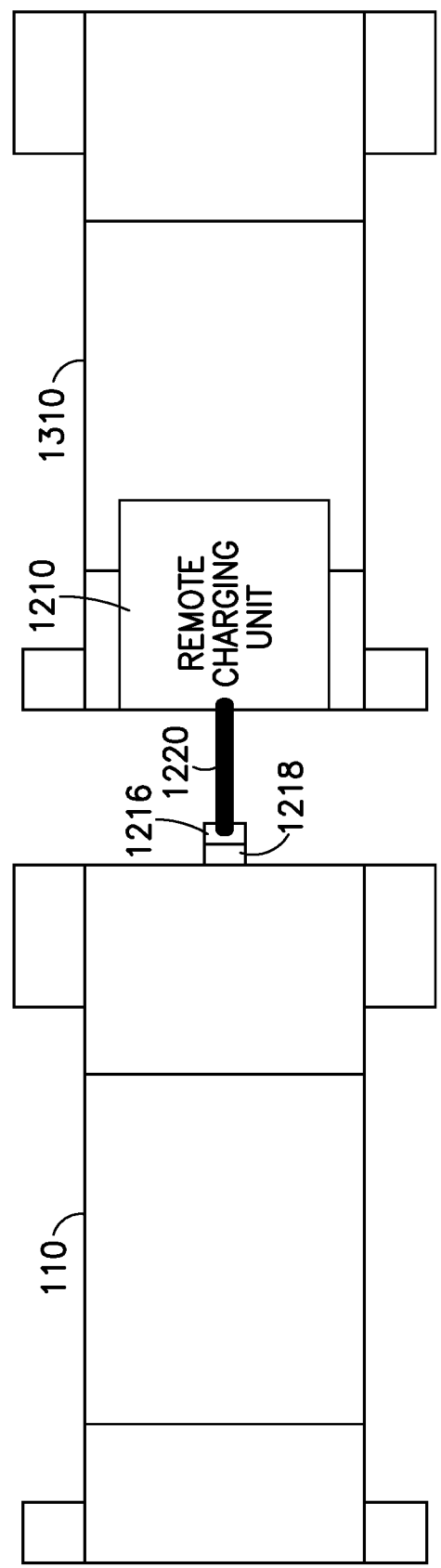
FIG. 12 is a schematic illustration of a system using a transportable charger in accordance with aspects of the disclosed embodiment.

Turning to FIGS. 11 and 12, a remote charging unit 1210 may be provided to charge at least one autonomous rover 110 requiring a charge and unable to reach a charging location. The remote charging unit 1210 may be sized and shaped so as to be transportable by maintenance personnel or another autonomous rover. In one aspect the remote charging unit 1210 may take the form of a backpack, a carry case or have any other suitable transportable configuration. In another aspect the remote charging unit may be a transportable unit that can be mounted to or otherwise affixed to another autonomous rover 1310 (FIG. 12) for transport through the storage and retrieval system.

The remote charging unit may include any suitable energy storage unit 1212 such as a battery or capacitor. The energy storage unit may be rechargeable so that the remote charging unit 1210 may be reusable. The remote charging unit may include any suitable controls 1214. For example, the controls may provide for an operator to start and stop a charge and/or automatic start and stop of a charge upon, e.g., detection that the remote charging unit is coupled to the autonomous rover in need of charge. The remote charging unit may also include one or more connectors 1216 for transferring energy from the energy storage unit 1212 to an onboard energy source of the at least one rover requiring a charge. Where two connections 1216 are provided simultaneous charging of rovers may be performed. In one aspect a rover requiring a charge may include a plug or other suitable connector 1218 in which the remote charging unit connector 1216 interfaces for the transfer of energy. In other aspects, such as when the remote charging unit 1210 is carried by another rover 1310, the remote charging unit may include a probe 1220 that interfaces with the connector 1218 of the rover requiring a charge such that when rovers 110 and 1310 are disposed adjacent one another the probe is aligned with the receptacle (FIG. 12). The remote charging unit 1210 may be used to charge one or more rovers (e.g. individually or simultaneously) at any location within the storage and retrieval structure or outside the storage and retrieval structure.

In accordance with one or more aspects of the disclosed embodiment, a charging system for an autonomous rover includes a charging interface with contacts that interface with the autonomous rover, a rover power source for the autonomous rover, and circuitry operated by the autonomous rover for controlling charging of the rover power source.

In accordance with one or more aspects of the disclosed embodiment, an output of the charging interface is enabled when the rover accesses and de-accesses the contacts.

In accordance with one or more aspects of the disclosed embodiment, the charging system includes one or more charging stations each of which includes the charging interface and rover entry to a charging station is decoupled or independent from a charging station status.

In accordance with one or more aspects of the disclosed embodiment, the charging system includes a charging supply connected to the charging interface, the charging supply being configured to switch between one or more of a constant current output mode, a constant voltage output mode, or a constant power output mode and switching between different output modes may be effected by one or more of automatically by the charging supply and by commands received from the circuitry operated by the autonomous rover.

In accordance with one or more aspects of the disclosed embodiment, the circuitry operated by the autonomous rover is configured to control an output of the charging interface to effect charging of the rover power source independent of a charging interface status when the autonomous rover accesses and de-accesses the contacts.

In accordance with one or more aspects of the disclosed embodiment, the charging interface is disposed at a charging location and the circuitry operated by the autonomous rover is configured to cause an output of the charging interface to change between a safe and unsafe state to effect a hot swap entry and departure of the autonomous rover with respect to the charging location.

In accordance with one or more aspects of the disclosed embodiment, the charging system for an autonomous rover is part of a storage and retrieval system.

In accordance with one or more aspects of the disclosed embodiment, a charging system for an autonomous rover includes one or more charging stations configured to engage the autonomous rover, each of the charging stations comprising a charging supply; and a power source for the autonomous rover, wherein autonomous rover entry to a charging station is decoupled or independent from a charging station status.

In accordance with one or more aspects of the disclosed embodiment, an output of the charging supply is enabled when the rover accesses and de-accesses a respective charging station.

In accordance with one or more aspects of the disclosed embodiment, the charging supply is configured to switch between one or more of a constant current output mode, a constant voltage output mode, and a constant power output mode.

In accordance with one or more aspects of the disclosed embodiment, switching between different output modes may be effected by one or more of automatically by the charging supply and by commands received from the circuitry operated by the autonomous rover.

In accordance with one or more aspects of the disclosed embodiment, the charging system further includes circuitry on-board and operated by the autonomous rover, the circuitry being configured to control an output of the one or more charging stations to effect charging of the power source independent of a charging station status when the autonomous rover accesses and de-accesses the contacts.

In accordance with one or more aspects of the disclosed embodiment, a charging system for an autonomous rover includes a charging station having contacts configured to engage the autonomous rover, a power source for the autonomous rover, and circuitry operated by the autonomous rover the circuitry being configured to cause an output of the charging station to change between a safe and unsafe state to effect a hot swap entry and departure of the autonomous rover with respect to the charging station.

In accordance with one or more aspects of the disclosed embodiment, an output of the charging station is enabled when the rover accesses and de-accesses the contacts.

In accordance with one or more aspects of the disclosed embodiment, the charging supply is configured to switch between one or more of a constant current output mode, a constant voltage output mode, and a constant power output mode.

In accordance with one or more aspects of the disclosed embodiment, switching between different output modes may be effected by one or more of automatically by the charging supply and by commands received from the circuitry operated by the autonomous rover.

In accordance with one or more aspects of the disclosed embodiment, a charging system for an autonomous rover includes a system controller and a charging station with one or more charging interfaces configured to engage the autonomous rover for charging, wherein entry to the charging station is under control of the autonomous rover and independent of the system controller.

In accordance with one or more aspects of the disclosed embodiment, an output of the charging interface is energized when the autonomous rover accesses and de-accesses the contacts.

In accordance with one or more aspects of the disclosed embodiment, entry to the charging station is independent of communication between the autonomous rover and the system controller.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A charging system for an autonomous rover, the charging system comprising:
    a charging interface with contacts that interface with the autonomous rover;
    a rover power source for the autonomous rover; and
    circuitry operated by the autonomous rover for controlling an operational charging mode of the charging interface to effect charging of the rover power source, wherein the circuitry operated by the autonomous rover is configured to control an output of the charging interface to effect charging of the rover power source independent of a charging interface status when the autonomous rover accesses and de-accesses the contacts.

2. The charging system of claim 1, wherein an output of the charging interface is enabled when the rover accesses and de-accesses the contacts.

3. The charging system of claim 1, further comprising one or more charging stations each of which includes the charging interface and rover entry to a charging station is decoupled or independent from a charging station status.

4. The charging system of claim 1, further comprising a charging supply connected to the charging interface, the charging supply being configured to switch between one or more of a constant current output mode, a constant voltage output mode, and a constant power output mode.

5. The charging system of claim 4, wherein switching between different output modes may be effected by one or more of automatically by the charging supply and by commands received from the circuitry operated by the autonomous rover.

6. The charging system of claim 1, wherein the charging interface is disposed at a charging location and the circuitry operated by the autonomous rover is configured to cause an output of the charging interface to change between a safe and unsafe state to effect a hot swap entry and departure of the autonomous rover with respect to the charging location.

7. A charging system for an autonomous rover, the charging system comprising:
    a charging interface with contacts that interface with the autonomous rover;
    a rover power source for the autonomous rover; and
    circuitry operated by the autonomous rover for controlling an operational charging mode of the charging interface to effect charging of the rover power source;
    wherein the charging system for the autonomous rover is part of a storage and retrieval system.

8. A charging system for an autonomous rover, the charging system comprises:
    a charging station having contacts configured to engage the autonomous rover;
    a power source for the autonomous rover; and
    circuitry operated by the autonomous rover, the circuitry being configured to cause an output of the charging station to change between a safe and unsafe state, wherein the contacts of the charging station are energized in both of the safe and unsafe states so that the autonomous rover effects a hot swap entry and departure with respect to the charging station, changed from the unsafe state to the safe state with the contacts being energized.

9. The charging system of claim 8, wherein an output of the charging station is enabled when the rover accesses and de-accesses the contacts.

10. The charging system of claim 8, wherein the charging supply is configured to switch between one or more of a constant current output mode, a constant voltage output mode, and a constant power output mode.

11. The charging system of claim 10, wherein switching between different output modes may be effected by one or more of automatically by the charging supply and by commands received from the circuitry operated by the autonomous rover.

12. A charging system for an autonomous rover, the charging system comprises:
    a storage and retrieval system controller; and
    a charging station with one or more charging interfaces configured to engage the autonomous rover for charging, the charging station being connected to the storage and retrieval system controller;
    wherein entry to the charging station is under control of the autonomous rover and independent of the storage and retrieval system controller.

13. The charging system of claim 12, wherein an output of the charging interface is energized when the autonomous rover accesses and de-accesses the contacts.

14. The charging system of claim 12, wherein entry to the charging station is independent of communication between the autonomous rover and the system controller.

* * * * *